Feb. 25, 1941.  C. W. LLOYD  2,232,683
PITCH CHANGING MECHANISM FOR OPPOSITELY ROTATING PROPELLERS FOR AIRCRAFT
Filed April 25, 1940  2 Sheets-Sheet 1

Patented Feb. 25, 1941

2,232,683

UNITED STATES PATENT OFFICE 2,232,683

PITCH CHANGING MECHANISM FOR OPPOSITELY ROTATING PROPELLERS FOR AIRCRAFT

Charles W. Lloyd, Greensboro, N. C.

Application April 25, 1940, Serial No. 331,654

8 Claims. (Cl. 170—135.6)

This invention relates to an improved drive and pitch-changing mechanism unit for counter rotating tandem propellers.

The superior efficiency of counterrotating tandem propellers over a single four-bladed propeller designed to absorb the same power, and over single two-bladed propellers having relatively high blade angle setting is well known, and the desirability of being able to simultaneously and equally change the blades of the counterrotating tanedm propellers is recognized by those skilled in the art. However, insofar as it is within the knowledge of applicant, the pitch change of the blades of such propellers has heretofore been effected solely by reciprocatory mechanism connected to projecting arms on the propeller blades, a construction which leaves much to be desired in the way of balance, strength and reliability, and in which the turning moment varies with the changing angularity of the projecting arms with respect to the reciprocatory means which operate them, and in which the arc of pitch variation is limited.

The present invention provides a unit in which these faults and deficiencies are eliminated.

It has for one of its objects to provide a closely integrated driving and pitch-changing unit in which the pitch-changing mechanism is rotary, as contrasted with reciprocable; coaxial with the rotary driving mechanism, and nested with respect thereto.

Another object of the invention is to provide a unit of the class described, having an unlimited range of pitch adjustment.

Still another object of the invention is to provide a combined pitch-changing and driving unit for counterrotating tandem propellers which is safe, sturdy, reliable, readily assembled and disassembled.

Other objects of the invention will appear as the following description of a preferred and practical embodiment thereof proceeds.

In the drawings throughout the several figures of which the same reference characters have been used to designate identical parts:

Figure 3 is a side elevation.

Figure 1:
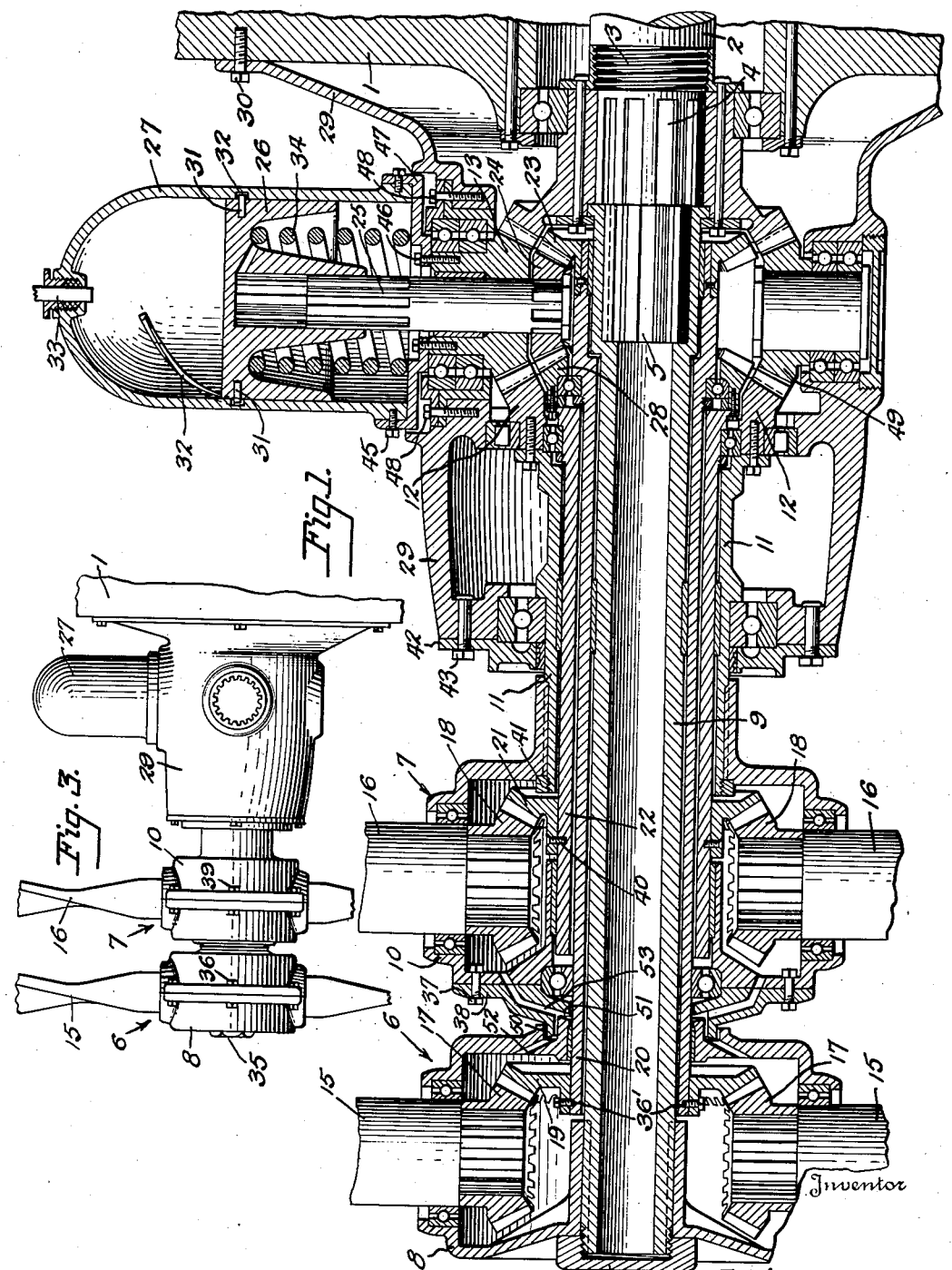
Figure 1 is a longitudinal section through a combined driving and pitch-changing unit embodying the principles of the present invention.
Figure 2:
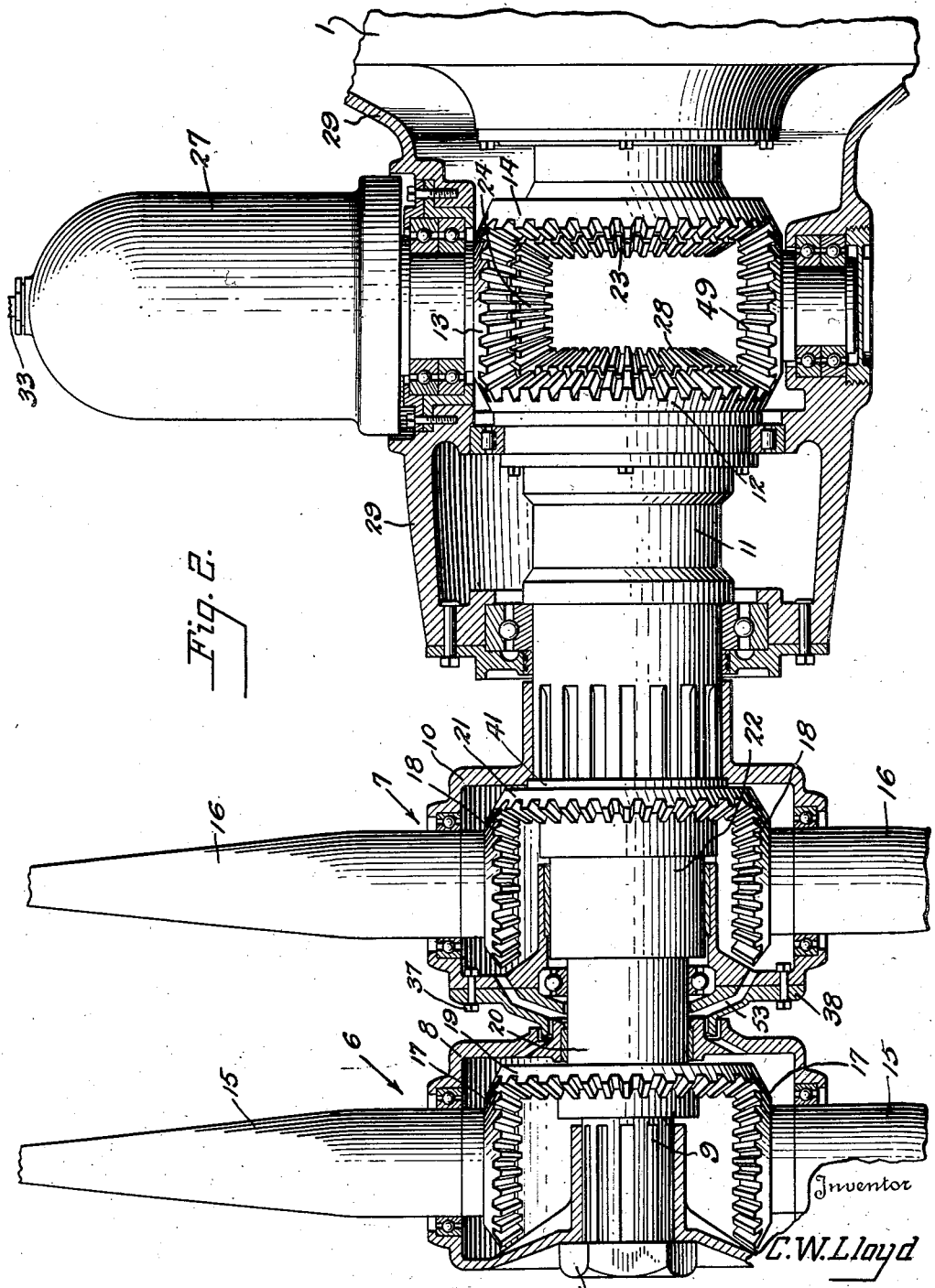
Figure 2 is a side view showing the gears in elevation and other parts in section.

Referring now in detail to the several figures, the numeral 1 represents the engine housing, 2 being the engine shaft which has a threaded zone 3, and having the end portion formed with a splined section 4 of large diameter and a terminal splined section 5 of smaller diameter. To these two splined sections are splinably secured the drive shafts which drive the propellers 6 and 7. The propeller 6 comprises a hollow hub 8 which is fixed to the drive shaft 9 splinably secured to the terminal section 5 of the engine shaft. The propeller 7 comprises the hollow hub 10 which is fixed to the drive shaft 11, said drive shaft including a gear set comprising the gear 12 which is fixed to said drive shaft, the reverse gear 13 and the gear 14 which is splinably secured to the end section 4 of the engine shaft. By virtue of the reversing gear set in the drive shaft 11, the propellers are driven in opposite directions and as there is no change in speed ratio in this reversing gear set the propellers will normally travel in the same speeds. It will be noted that the drive shafts 9 and 11 are coaxial and nested one within the other, the inner drive shaft 9 extending beyond the outer drive shaft 11, the propellers being close-mounted in tandem relation.

In order to permit the pitch of the propeller blades 15 and 16 of the respective propellers to be changed, said blades are rotatably mounted in their respective hubs and at their inner ends within said hubs, they have the respective gears 17 and 18 fixed thereto.

The gear 17 is in mesh with the gear 19 on the end of a pitch-changing shaft 20, while the gear 18 is in mesh with a gear 21 on the end of a pitch-changing shaft 22. It will be observed that the pitch-changing shafts 20 and 22 have the form of sleeves, one rotating upon the other, that they are coaxial with the drive shafts and occupy an intermediate position between the inner drive shaft 9 and the outer drive shaft 11. The pitch-changing shafts 20 and 22 enter the hubs 8 and 10 and the gears 19 and 21 are within said hubs.

Hereinafter in contrasting the direction in which the propellers rotate, the propeller 6 will be referred to as the directly driven propeller, and the propeller 7 as the reverse driven propeller, and the pitch-changing shafts associated with said propellers will be similarly distinguished.

The pitch-changing shaft 20 which serves the blades 15 of the propeller 6 is directly driven through a gear 23 secured to said shaft and which meshes with a gear 24 secured to a stub shaft 25. Said stub shaft may be directly driven in any of a number of ways, depending upon the particular known pitch control means which is employed in connection with the apparatus. It is here shown as being nonrotatably splined to a piston 26 which in normal operation is nonrotatably connected to a cylinder wall 27 which latter is directly rotated through the gear 13 which is part of the drive connection of the drive shaft 11 and which is directly driven from the engine shaft by the gear 14. There is no speed change ratio in the driving train of the pitch-changing shaft 20, and consequently, there is normally no rotation between the gears 17 on the propeller blades 15 and the gear 19 on the pitch-changing shaft 20 as the propeller 6 revolves.

The pitch-changing shaft 22 associated with the reversely driven propeller 7 carries a gear 28 which is in mesh with the gear 24 fixed to the stub shaft 25, and which gear 24 acts as a reversing gear with respect to the pitch-changing shaft 22. As there is no speed change ratio in the line of drive of the pitch-changing shaft 22, there is normally no rotation between the gears 18 on the propeller blades 16 of the propeller 7 and the gear 21 fixed to the pitch-changing shaft 22, as the propeller 7 revolves. Consequently, in the normal revolution of the two propellers in opposite directions, there will be no change of pitch.

It is obvious to those skilled in the art that if, while the propellers are so rotating, the stub shaft 25 were rotated by any desired instrumentality, a speed differential would be simultaneously created between both of the pitch-changing shafts 20 and 22 and the corresponding propeller drive shafts 9 and 11 during the period of such rotation of the stub shaft 25, so that during the period of such speed differential there would be rotary movement between the gears on the hub ends of the respective propeller blades and the gears on the respective pitch-changing shafts resulting in change in pitch of the propeller blades, equal and in opposite directions.

As shown, the stub shaft 25 is journally mounted in bearings supported by a fixed extension 29 suitably bonded as by the bolts 30 to the engine casing. The pitch change controlling device, here illustrated, is of known type, in which the piston 26 is provided with pins 31 riding in inclined cam slots 32 formed in the cylinder wall at opposite sides. Fluid pressure is admitted at will to the cylinder above the piston through a fluid pressure conduit 33. The cylinder 27 is fixed to the gear 13 and rotates therewith. Normally, that is to say, when no fluid pressure is being admitted to the cylinder 27 for pitch-changing purposes, the piston 26 occupies a fixed position within the cylinder 27 and rotates therewith, in turn rotating the stub shaft 25 which is splined thereto. When fluid pressure is admitted to the cylinder 27, the piston performs a screwing movement with respect to the cylinder by virtue of the spiral slots 32, thus causing a corresponding partial rotation of the stub shaft 25 and the gear 24 which is fixed thereto, which creates angular displacement between the two drive shafts 9 and 11 and the two pitch-changing shafts 20 and 22.

The pitch change controlling mechanism is not primarily a part of the present invention, and is therefore, somewhat diagrammatically shown. As shown, the piston 26 will return to its normal position under the tendency of the propellers when in motion to assume a zero pitch position due to air resistance.

The fluid pressure pitch change control mechanism could, of course, be substituted by other equivalent devices, such for example as an electric motor geared down to the proper ratio for imparting the necessary angular displacement to the stub shaft 25.

It will be observed that the arrangement of parts is such that the drive and pitch-changing shafts are nested one within another, and that the pitch-changing shafts occupy a sleeved relation between the inner and outer drive shafts, also that the gear set involved in the operation of the pitch-changing shafts is coaxial with and nested within the gear set which operates the reversely driven drive shaft.

This arrangement of parts provides a well balanced and closely integrated structural unit substantialy vibrationless and readily assembled or disassembled.

In taking the unit apart, the propellers are removed, first by taking off the nut 35 at the end of the drive shaft 9. The propeller hub 8 is next separated by removing the lug bolts 36. The outer half of the propeller hub is then drawn from the drive shaft 9, whereupon, the propeller blades 15, together with their hub gears, are released for removal. This gives access to the stud bolts 36' which secure the gear 19 to the pitch-changing shaft 20. After this gear has been removed the inner half of the hub 8 can be slipped off. This gives access to the bolts 37 which secure the bearing plate 38 in place. Upon removal of this bearing plate and of the lug bolts 39, the outer half of the hub 10 may be slipped from the end of the pitch-changing shaft 22, the propeller blades 16 with their hub gears being thus released for removal.

This gives access to the screws 40 and for release of the gear 21 which is fixed to the pitch-changing shaft 22. After removal of this gear the ring nut 41 becomes accessible, after removing which the inner half of the hub 10 may be drawn off of the drive shaft 11. Removal of the end plate 42 of the extension housing 29 is thus made possible, and removal of the bearing 43 which gives access to the heads of the stud bolts 44 for the removal of the shaft 11.

The cylinder 27 can be removed by taking out the bolts 45, thus exposing the bolts 46, the removal of which enables the base plate 47 of the cylinder 27 to be taken off, exposing the heads of the stud bolts 48. After these bolts have been removed, the stub shaft with the gears 13 and 24 can be removed as a unit.

By removing the bolts 30, which secure the extension housing 29 to the engine housing, the extension housing can be slipped along the shaft 22, exposing the securing means by which the remaining parts of the mechanism are maintained in assembled relation.

The gear 49 which is journaled in bearings in the lower part of the extension housing 29, and which meshes with the gears 12 and 14 of the drive shaft 11, is one of several gears which may be arranged around the gears 12 and 14 for distribution of the load.

Reference is now made to an oil conserving feature between the hubs of the two propellers.

It is obvious that at the line of juncture where the propeller hubs freely surround the pitch-changing shaft 20, there would be the opportunity for oil leakage, the oil being thrown out by centrifugal force. To avoid this, the hub 8 is provided with an annular channel 50, and the bearing plate 38 of the hub 10 with an annular flange interfitting with said channel. Said channel is in communication with the line of juncture between the two hubs and the pitch-changing shaft 20, by means of the conduit 51, and is also in communication with the interior of the hubs 8 and 10 by means of the respective channels 52 and 53. Thus, any oil thrown by centrifugal force is caught within the channel 50 and redistributed to the hubs 8 and 10.

While I have in the above description disclosed an embodiment which is connected to the prime mover without the intermediary of reduction gearing, it will, of course, be understood that with high powered engines, reduction gearing might be employed without affecting the structure, function, or operation of the invention, and it is also to be understood that the details of construction as shown and described are by way of example, and not to be construed as limiting the invention which is defined in the appended claims.

What I claim as my invention is:

1. In an oppositely rotating coaxial propeller drive for aircraft, in combination, a plurality of coaxial nested shafts, two of which being driven shafts, of which the end of the inner projects beyond the end of the outer, propellers with oppositely pitched blades mounted on said ends of said drive shafts to rotate therewith, the blades of said propellers being rotatable about their own axes, and having gears at their hub ends to effect their rotation, one of said drive shafts being connected direct to the power shaft of a prime mover, the other drive shaft being driven from said prime mover through a reverse gear set, other two of said nested shafts being propeller blade pitch-changing shafts, each carrying a gear, which gears mesh with the hub gears of the blades of the respective propellers, that one of the pitch-changing shafts which is in operative connection with the blades of the directly driven propeller being directly driven by the directly driven drive shaft, and that one of the pitch-changing shafts which is in operative connection with the blades of the reversely driven propeller being driven by the directly driven drive shaft through the intermediary of a reverse gear set, and means intercalated in the driving connection between said directly driven drive shaft and said pitch-changing shafts for angularly displacing said pitch changing shafts about their axes while they are being driven, thus creating speed differential between said drive shafts and said pitch-changing shafts while being so displaced, resulting in simultaneous rotation of the hub gears of the blades of both propellers, effecting simultaneous change of pitch in the blades of both propellers.

2. In an oppositely rotating coaxial propeller drive for aircraft, in combination, a plurality of coaxial nested shafts, two of which being driven shafts, of which the end of the inner projects beyond the end of the outer, propellers with oppositely pitched blades mounted on said ends of said drive shafts to rotate therewith, the blades of said propellers being rotatable about their own axes, and having gears at their hub ends to effect their rotation, one of said drive shafts being connected direct to the power shaft of a prime mover, the other drive shaft being driven from said prime mover through a reverse gear set without change of speed ratio, other two of said nested shafts being propeller blade pitch-changing shafts, each carrying a gear, which gears mesh with the hub gears of the blades of the respective propellers, that one of the pitch-changing shafts which is in operative connection with the blades of the directly driven propeller being directly driven by the directly driven drive shaft, and that one of the pitch-changing shafts which is in operative connection with the blades of the reversely driven propeller being driven by the directly driven drive shaft through the intermediary of a reverse gear set without change of speed ratio, and means intercalated in the driving connection between said directly driven drive shaft and said pitch-changing shafts for angularly displacing said pitch-changing shafts about their axes while they are being driven, thus creating speed differential between said drive shafts and said pitch-changing shafts while being so displaced, resulting in simultaneous rotation of the hub gears of the blades of both propellers, effecting simultaneous and equal change of pitch in the blades of both propellers.

3. In an oppositely rotating coaxial propeller drive for aircraft, in combination, a pair of coaxial nested drive shafts, the end of the inner extending beyond the end of the outer of said shafts, propellers mounted on said ends of said drive shafts to rotate therewith, each propeller comprising a hollow hub secured to its respective drive shaft, and having blades rotatably mounted in said hubs, including a gear on the inner end of each blade within said hubs for rotating said blades, the blades of the respective propellers being oppositely pitched, a pair of propeller blade pitch-changing shafts coaxial with and in nested relation to said drive shafts, said pitch-changing shafts entering the respective hubs, and each carrying a gear meshing with the propeller blade gears within the respective hubs, one of said drive shafts being connected direct to the power shaft of a prime mover, the other drive shaft being driven from said prime mover through a reverse gear set without change of speed ratio, that one of the pitch-changing shafts which is in geared connection with the blades of the directly driven propeller being directly driven through the directly driven drive shaft, and that one of the pitch-changing shafts which is in geared connection with the blades of the reversely driven propeller being driven through the directly driven drive shaft through the intermediary of a reverse gear set without change of speed ratio, and means intercalated in the driving connection between said directly driven drive shaft and said pitch-changing shafts for angularly displacing said pitch-changing shafts about their axes while they are being driven, thus creating speed differential between said drive shafts and said pitch changing shafts while being so displaced, resulting in simultaneous rotation of the hub gears of the blades of both propellers, effecting simultaneous and equal change of pitch in the blades of both propellers.

4. In an oppositely rotating coaxial propeller drive for aircraft, in combination, a pair of coaxial nested drive shafts, the end of the inner extending beyond the end of the outer of said shafts, propellers mounted on said ends of said drive shafts to rotate therewith, each propeller comprising a hollow hub secured to its respective drive shaft, and having blades rotatably mounted in said hubs, including a gear on the inner end of each blade within said hubs for rotating said blades, the blades of the respective propellers being oppositely pitched, a pair of propeller blade pitch-changing shafts coaxial with and in nested relation to said drive shafts, said pitch-changing shafts entering the respective hubs, said hubs each bearing on one side upon one of said pitch-changing shafts, each pitch-changing shaft carrying a gear meshing with the propeller blade gears within the respective hubs, one of said drive shafts being connected direct to the power shaft of a prime mover, the other drive shaft being driven from said prime mover through a reverse gear set without change of speed ratio, that one of the pitch-changing shafts which is in geared connection with the blades of the directly driven propeller being directly driven through the directly driven drive shaft, and that one of the pitch-changing shafts which is in geared connection with the blades of the reversely driven propeller being driven through the directly driven drive shaft through the intermediary of a reverse gear set without change of speed ratio, and means intercalated in the driving connection between said directly driven drive shaft and said pitch-changing shafts for angularly displacing said pitch-changing shafts about their axes while they are being driven, thus creating speed differential between said drive shafts and said pitch changing shafts while being so displaced, resulting in simultaneous rotation of the hub gears of the blades of both propellers, effecting simultaneous and equal change of pitch in the blades of both propellers.

5. In an oppositely rotating coaxial propeller drive for aircraft, in combination, a pair of coaxial nested drive shafts, the end of the inner extending beyond the end of the outer of said shafts, propellers mounted on said ends of said drive shafts to rotate therewith, each propeller comprising a hollow hub, said hubs having their remote sides secured to their respective drive shafts, and having an oil seal at their adjacent sides comprising an exterior annular flange on the adjacent side of one seating in an exterior annular channel on the adjacent side of the other and bridging the line of juncture between said hubs, with an oil conduit leading from said channel to the interior of the hub having the channel, and an oil conduit leading from said channel to the interior of the other hub, said propellers having blades rotatably mounted in said hubs, including a gear on the inner end of each blade within said hubs for rotating said blades, the blades of the respective propellers being oppositely pitched, a pair of propeller blade pitch-changing shafts coaxial with and in nested relation to said drive shafts, said pitch-changing shafts entering the respective hubs, and each carrying a gear meshing with the propeller blade gears within the respective hubs, one of said drive shafts being connected direct to the power shaft of a prime mover, the other drive shaft being driven from said prime mover through a reverse gear set without change of speed ratio, that one of the pitch-changing shafts which is in geared connection with the blades of the directly driven propeller being directly driven through the directly driven drive shaft, and that one of the pitch-changing shafts which is in geared connection with the blades of the reversely driven propeller being driven through the directly driven drive shaft through the intermediary of a reverse gear shaft without change of speed ratio, and means intercalated in the driving connection between said directly driven drive shaft and said pitch-changing shafts for angularly displacing said pitch-changing shafts about their axes while they are being driven, thus creating speed differential between said drive shafts and said pitch-changing shafts while being so displaced, resulting in simultaneous rotation of the hub gears of the blades of both propellers, effecting simultaneous and equal change of pitch in the blades of both propellers.

6. In an oppositely rotating coaxial propeller drive for aircraft, in combination, a plurality of coaxial nested shafts, two of which being driven shafts, of which the end of the inner projects beyond the end of the outer, propellers with oppositely pitched blades mounted on said ends of said drive shafts to rotate therewith, the blades of said propellers being rotatable about their own axes, and having gears at their hub ends to effect their rotation, one of said drive shafts being connected direct to the power shaft of a prime mover, the other drive shaft being driven from said prime mover through a reverse gear set without change of speed ratio, said reverse gear set including a pair of coaxial bevel gears on divided sections of said shaft, a stub shaft rotatable in bearings in a fixed support, having its axis in a plane perpendicular to the axis of said drive shaft, and a bevel reverse gear journaled on said stub shaft, meshing with said coaxial bevel gears on said drive shaft and indirectly connected thereto, normally to rotate said stub shaft synchronously with said bevel gear, other two of said nested shafts being propeller blade pitch-changing shafts, each carrying a gear, which gears mesh with the hub gears of the blades of the respective propellers, that one of the pitch-changing shafts which is in operative connection with the blades of the directly driven propeller being directly driven by the directly driven drive shaft, and that one of the pitch-changing shafts which is in operative connection with the blades of the reversely driven propeller being driven by the directly driven drive shaft through the intermediary of a reverse gear set without change of speed ratio, said reverse gear set including a pair of coaxial bevel gears on divided sections of said pitch-changing shaft, and a bevel reverse gear fixed to said stub shaft, meshing with said coaxial bevel gear on said pitch-changing shaft, and pitch-change controlling means intercalated between said stub shaft and the bevel gear journaled thereupon varying the relative angularity of said bevel gear and stub shaft, thus angularly displacing said pitch changing shafts about their axes while they are being driven, creating speed differential between said drive shafts and said pitch-changing shafts while being so displaced, resulting in simultaneous rotation of the hub gears of the blades of both propellers, effecting simultaneous and equal change of pitch in the blades of both propellers.

7. In an oppositely rotating coaxial propeller drive for aircraft, in combination, a plurality of coaxial nested shafts, two of which being driven shafts, of which the end of the inner projects beyond the end of the outer, propellers with oppositely pitched blades mounted on said ends of said drive shafts to rotate therewith, the blades of said propellers being rotatable about their own axes, and having gears at their hub ends to effect their rotation, one of said drive shaft being connected direct to the power shaft of a prime mover, the other drive shaft being driven from said prime mover through a reverse gear set without change of speed ratio, said reverse gear set including a pair of coaxial bevel gears on divided sections of said shaft, a stub shaft rotatable in bearings in a fixed support, having its axis in a plane perpendicular to the axis of said drive shaft, and a bevel reverse gear journaled on said stub shaft, meshing with said coaxial bevel gears on said drive shaft and indirectly connected thereto, normally to rotate said stub shaft synchronously with said bevel gear, other two of said nested shafts being propeller blade pitch-changing shafts, each carrying a gear, which gears mesh with the hub gears of the blades of the respective propellers, that one of the pitch-changing shafts which is in operative connection with the blades of the directly driven propeller being directly driven by the directly driven drive shaft, and that one of the pitch-changing shafts which is in operative connection with the blades of the reversely driven propeller being driven by the directly driven drive shaft through the intermediary of a reverse gear set without change of speed ratio, said reverse gear set including a pair of coaxial bevel gears on divided sections of said pitch-changing shaft, arranged between the coaxial bevel gears of the drive shaft reverse gear set, and a bevel reverse gear fixed to said stub shaft, arranged radially inwardly of the bevel gear which is journaled on said stub shaft and meshing with said coaxial bevel gears on said pitch-changing shaft, and pitch-change controlling means intercalated between said stub shaft and the bevel gear journaled thereupon varying the relative angularity of said bevel gear and stub shaft, thus angularly displacing said pitch changing shafts about their axes while they are being driven, creating speed differential between said drive shafts and said pitch-changing shafts while being so displaced, resulting in simultaneous rotation of the hub gears of the blades of both propellers, effecting simultaneous and equal change of pitch in the blades of both propellers.

8. In an oppositely rotating coaxial propeller drive for aircraft, in combination, a central shaft and three shafts sleeved one upon another and upon the central shaft, the central and outer shaft constituting a pair of drive shafts, the end of the central shaft extending beyond the end of the outer shaft, propellers mounted on said ends of said drive shafts to rotate therewith, each propeller comprising a hollow hub secured to its respective drive shaft, and having blades rotatably mounted in said hubs, including a gear on the inner end of each blade within said hubs for rotating said blades, the blades of the respective propellers being oppositely pitched, the intermediate shafts constituting a pair of propeller blade pitch-changing shafts, entering the respective hubs and each carrying a gear meshing with the propeller blade gears within the respective hubs, one of said drive shafts being connected direct to the power shaft of a prime mover, the other drive shaft being driven from said prime mover through a reverse gear set without change of speed ratio, said reverse gear set including a pair of coaxial bevel gears on divided sections of said shaft, a stub shaft rotatable in bearings in a fixed support, having its axis in a plane perpendicular to the axis of said drive shaft, and a bevel reverse gear journaled on said stub shaft, meshing with said coaxial bevel gears on said drive shaft and indirectly connected thereto, normally to rotate said stub shaft synchronously with said bevel gear, other two of said nested shafts being propeller blade pitch-changing shafts, each carrying a gear, which gears mesh with the hub gears of the blades of the respective propellers, that one of the pitch-changing shafts which is in operative connection with the blades of the directly driven propeller being directly driven by the directly driven drive shaft, and that one of the pitch-changing shafts which is in operative connection with the blades of the reversely driven propeller being driven by the directly driven drive shaft through the intermediary of a reverse gear set without change of speed ratio, said reverse gear set including a pair of coaxial bevel gears on divided sections of said pitch-changing shaft, arranged between the coaxial bevel gears of the drive shaft reverse gear set, and a bevel reverse gear fixed to said stub shaft, arranged radially inwardly of the bevel gear which is journaled on said stub shaft and meshing with said coaxial bevel gears on said pitch-changing shaft, and pitch-change controlling means intercalated between said stub shaft and the bevel gear journaled thereupon varying the relative angularity of said bevel gear and stub shaft, thus angularly displacing said pitch changing shafts about their axes while they are being driven, creating speed differential between said drive shafts and said pitch-changing shafts while being so displaced, resulting in simultaneous rotation of the hub gears of the blades of both propellers, effecting simultaneous and equal change of pitch in the blades of both propellers.

CHARLES W. LLOYD.